United States Patent [19]

Costello

[11] Patent Number: 4,860,309

[45] Date of Patent: Aug. 22, 1989

[54] TRINARY BUS COMMUNICATION SYSTEM

[76] Inventor: John F. Costello, 7110 Convoy Ct., San Diego, Calif. 92111

[21] Appl. No.: 908,301

[22] Filed: Sep. 17, 1986

[51] Int. Cl.[4] .............................................. H04L 25/34
[52] U.S. Cl. ..................................... 375/17; 307/473; 370/85; 375/36
[58] Field of Search ........................... 375/17, 20, 36; 307/473, 475; 455/58; 340/825.03, 825.5; 370/6, 85, 79, 112

[56] References Cited

U.S. PATENT DOCUMENTS

| | | | |
|---|---|---|---|
| 2,700,696 | 1/1955 | Barker | 375/17 |
| 3,084,223 | 4/1963 | Marcatili et al. | 370/6 |
| 3,293,549 | 12/1966 | Patterson | 340/825.69 |
| 3,354,410 | 11/1967 | Buescher | 375/108 |
| 3,876,944 | 4/1975 | Mack et al. | 375/17 |
| 4,063,220 | 12/1977 | Metcalfe et al. | 370/85 |
| 4,253,185 | 2/1981 | Danielson | 375/20 |
| 4,254,501 | 3/1981 | Griffith | 375/36 |
| 4,337,465 | 6/1982 | Spracklen | 340/825.03 |
| 4,352,201 | 9/1982 | Miller et al. | 455/58 |
| 4,385,394 | 5/1983 | Pace | 375/36 |
| 4,631,428 | 12/1986 | Grimes | 307/473 |
| 4,686,396 | 8/1987 | Law et al. | 307/473 |

Primary Examiner—Benedict V. Safourek
Attorney, Agent, or Firm—Brown, Martin, Haller & McClain

[57] ABSTRACT

Trinary digital information is communicated over a pair of electrically conductive lines terminated line to line at at least one extremity by an impedance which generally matches the characteristic impedance of the two lines with respect to each other. One or more transmitters in electrical communication with the two lines selectively impose a first potential difference, a second potential difference distinct from the first, or no potential difference across the lines. One or more receivers in electrical communication with the two lines sense the first potential difference and interpret that as a first logical state, sense the second potential difference and interpret that as a second logical state, and sense no potential difference across the two lines and interpret that as a third logical state. In an embodiment the transmitters present no potential difference across the lines by presenting an impedance substantially higher than the characteristic impedance of the lines with respect to each other to the two lines. Preferably a plurality of nodes communicate in parallel with the two lines in bus fashion, some nodes capable of transmitting across the two lines as described above, and some nodes capable of sensing the discriminating the three logical states as described above, two of the states communicating binary information at discrete times and the other state marking the discrete times.

6 Claims, 3 Drawing Sheets

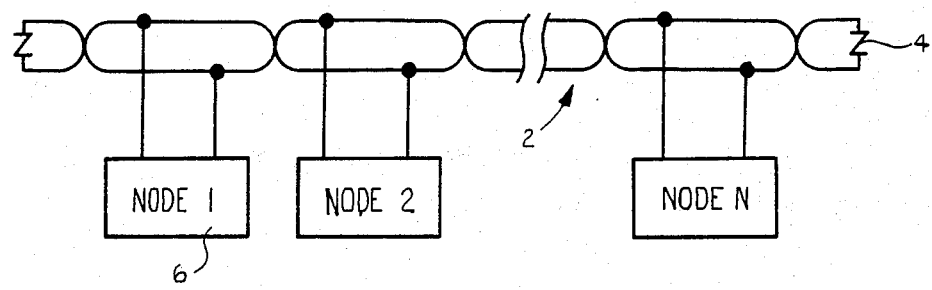
FIG. 1
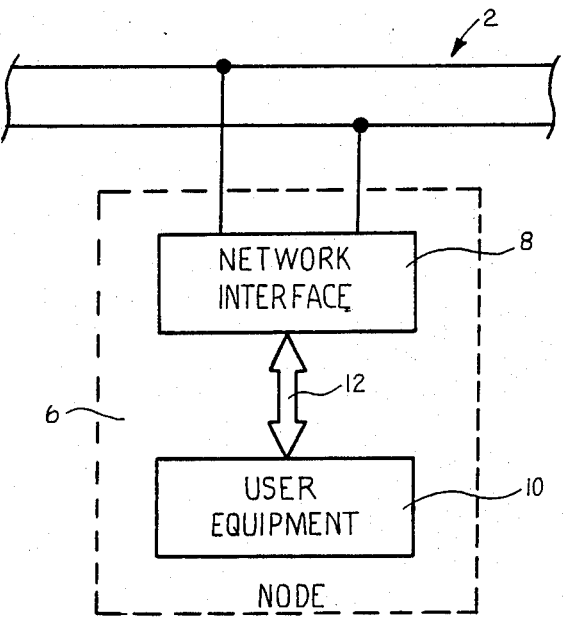
FIG. 2
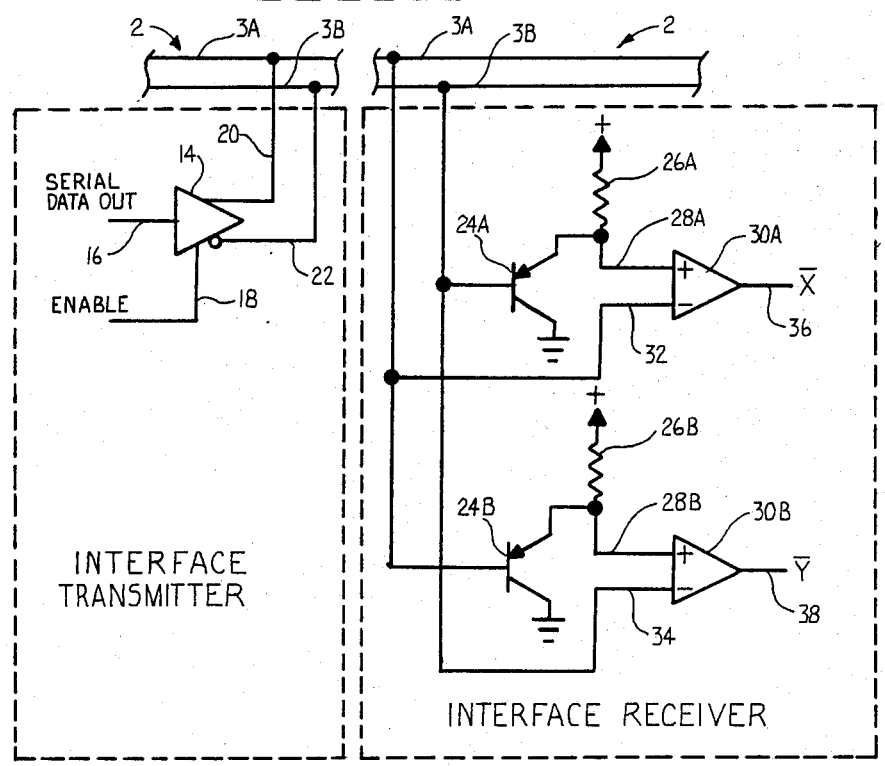
FIG. 3
FIG. 4

POTENTIAL ACROSS
BUS W/R TO LINE 3A

BIPOLAR OUTPUT $\overline{X}$ OF
1ST DIFF. AMPLIFIER 30A

BIPOLAR OUTPUT $\overline{Y}$ OF
2ND DIFF. AMPLIFIER 30B

NODE A TRANSMITTER
ATTEMPTING TO SEND

NODE B TRANSMITTER
ATTEMPTING TO SEND

SIGNAL ACTUALLY
SEEN BY RECEIVERS

INTEGRATOR OUTPUT

COLLISION COMPARATOR
OUTPUT

TRINARY BUS COMMUNICATION SYSTEM

BACKGROUND OF THE INVENTION

This invention relates in general to electronic communication buses by which multiple users communicate. It relates more specifically to communication networks in which a two line bus provides a trinary digital, two-way communication path between and among multiple users (nodes) who are in parallel communication with the bus.

The prior art presents many types of bus systems. U.S. Pat. No. 4,337,465 shows a patent primarily for a line driver circuit. It speaks of a three-state cycle, but the three states to which it refers are machine states rather than driver output states. The patent also speaks of random delays to avoid contention, but the random delays are more programmed than hardware controlled.

U.S. Pat. No. 4,282,512 shows a data communication system which employs phase encoded data. It is adaptable to two wire systems. This system monitors transistions at eight times the data transfer rate. "Illegal" transistions are detected by a read only memory. Collisions are detected primarily as being too many transissions or too few transistions.

U.S. Pat. No. 4,281,380 presents a bus collision avoidance system which uses a three part bus: a serial data bus, clock bus and a "busy" status line. The drivers and receivers of this system are differential. The system depends on a priorty scheme which is pre-established among the nodes on the bus.

U.S. Pat. No. 4,271,523 shows another collision detection system, but this system uses coding and decoding techniques to determine collisions. The system employs a carrier which signifies that the bus is busy in between data transmissions.

U.S. Pat. No. 4,262,357 presents a bus system which is controlled by arbiters and selectors.

U.S. Pat. No. 4,199,661 presents a time slot bus system. Each node has a time slot during which time it can seize the bus. Each node has a time slot indicator which is substantially synchronized with every other node.

The bus system, commonly called network, of this invention does not have an arbiter, selector, time slots, priorty scheme, nor a master bus controller. No controller is necessary to supervise and/or schedule nodal access to the bus. While it is true that such a system has the inherent problem of transmission collisions, the system of this invention utilizes a unique means of communicating trinary digital information over the two line bus to detect collisions and to provide un-encoded, self-clocking binary data.

Other attributes and advantages of this invention will be readily apparent upon a reading of the text hereinafter.

SUMMARY OF THE INVENTION

This invention presents a method and means of electrically communicating trinary digital information over two lines. The two lines can be a bus means comprising a pair of lines terminated at at least one extremity by an impedance between the lines which generally matches the electrical characteristic impedance of the lines, and at least one transmitter in electrical communication with the lines, and at least one receiver in electrical communication with the lines. All transmitters are adapted to selectively impose either of two distinct potential differences across the lines, and are further adapted to selectively impose no potential difference across the lines. In a bus system it is preferable to present a high impedance to both lines. All receivers are adapted to sense a first potential difference across the lines and interpret that as a first logical state, and are further adapted to sense a second potential difference, distinct from the first, across the lines and interpret that as a second logical state. The receivers are also adapted to sense a condition when all of the transmitters are presenting no potential difference across the lines and interpret that as a third logical state. The preferred method of transmitting a single data bit over a pair of electrically conductive lines comprises the steps of imposing either one of two possible potential difference across the lines over a fixed time interval as a binary data bit, and immediately thereafter imposing no potential differences and presenting a suitably high impedance to both lines over a second fixed time interval as a clock; preferably the time interval for imposing the potential difference is a standard time measurable by all receivers in order to detect collisions. The bus means can be the common transmission medium for a network of nodes. A node can be a transmitting node, a receiving node or both. The receivers and/or the transmitters are part of a node's interface circuitry to the two line bus means.

BRIEF DESCRIPTION OF THE DRAWINGS

FIG. 1 is a block diagram of a network utilizing the bus of this invention.

FIG. 2 is a block diagram of a node of the network and its connection to the bus of this invention.

FIG. 3 is a schematic of a transmitter as part of a network interface.

FIG. 4 is a schematic diagram of a receiver circuit as part of a network interface.

DESCRIPTION OF THE PREFERRED EMBODIMENT

Figure 5:
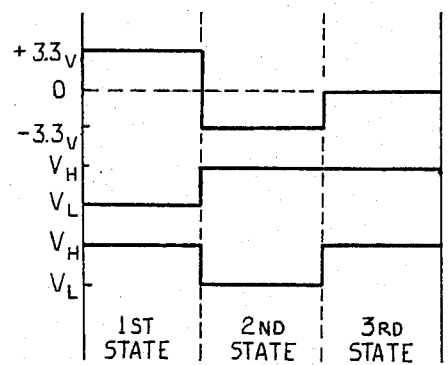
FIG. 5 is a signal diagram of the three bus states as transmitted by the transmitter and as sensed by the receiver circuit.

Referring to FIG. 1, a length of a twisted pair 2 of electrically conductive lines is shown to be terminated at its extremities by an impedance 4 between the lines, which impedance generally matches the characteristic impedance of the twisted pair. An N plurality of nodes 6 are in electrical communication with the twisted pair.

Referring to FIG. 2, a node is shown to comprise a network interface 8 in electrical communication with the twisted pair 2, and user equipment 10 in communication with the interface via data and control lines 12.

Referring to FIG. 3, a transmitter 14, which is a necessary part of a transmitting node's network interface, has a signal input 16 by which a node's serial data is communicated to the transmitter. The transmitter also has an "enable" input 18 by which the transmitter is selectively switched between operating as a differential-output amplifier and appearing to the bus only as a high impedance. A signal output 20 of the transmitter communicates with a first line 3A of the twisted pair, and an inverted signal output 22 communicates with a second line 3B of the twisted pair.

Referring to FIG. 4, a receiver which is a necessary part of receiving node's network interface is shown. The bases of a first and a second pnp transistors, 24A and 24B, are shown to be in communication with the second line 3B and the first line 3A, respectively, of the twisted pair 2. The transistors, 24A and 24B, are configured as common collector amplifiers. The emitter of the first transistor 24A is connected through a resistor 26A to a positive energizing voltage, and communicates with a non-inverting (NIV) input 28A of a first differential amplifier 30A. The emitter of the second transistor 24B is connected through a resistor 26B to a positive energizing voltage, and communicates with an NIV input 28B of a second differential amplifier 30B. The inverting (IV) input 32 of the first differential amplifier 30A is in communication with the first line 3A of the twisted pair, and the IV input 34 of the second differential amplifier 30B is in communication with the second line 3B of the twisted pair.

Referring again to FIG. 4, the common collector amplifier 24A is interposed between the line 3B and the NIV input 28A of the differential amplifier 30A to give the NIV input a positive bias with respect to the IV input 32, so that when there is no potential difference across the lines, the NIV input is sufficiently more positive than the IV input to force the differential amplifier output to be at a high state voltage. The same is true for the NIV input 28B of the differential amplifier 30B with respect to the IV input 34, that is, the common collector amplifier 24B gives it a positive bias. Since the paths from the lines to the IV inputs are direct and the paths from the lines to the NIV inputs are through the base-emitter junction of the transistors, the NIV inputs will both be biased more positive than the IV inputs due to the inherent potential drop across the forward biased base-emitter junctions. The bias will typically be 0.2 volts for geranium transistors and 0.7 volts for silicon transistors.

The transmitters are preferably RS 422- type line drivers with a high state output of typically 3.5 v and a low state output of typically 0.2 v. Thus the potential difference imposed across the lines by the transmitters is typically 3.3 v. This potential difference is clearly more than enough to overcome the bias on the differential amplifiers' NIV inputs when the potential difference opposes the bias. For example, when the potential difference across the lines is 3.3 v with the first line 3A being at the positive side, the actual potential difference felt by the inputs of the differential amplifier 30A will be 2.6 V in the case of a silicon transistor due to the algebraic addition of the potential drop across the base-emitter junction of the first transistor 24A.

The outputs 36 and 38 of the differential amplifiers, 30A and 30B respectively, are bi-polar, that is, each output has two states, a high state voltage and a low state voltage. Referring to FIG. 5, a signal timing diagram for three points are shown to define the three distinct states of the two line bus. The first signal shown represents the potential difference between the two lines, the plus (+) sign indicating that the first line 3A is positive with respect to the second line 3B, and the negative (−) sign indicating that line 3B is positive with respect to 3A. The second signal represents voltage at the bipolar output 36 of the first differential amplifier 30A, the third signal represents voltage at the bipolar output 38 of the second differential amplifier 30B, $V_H$ being the high state voltage and $V_L$ being the low state voltage. The transmitter puts the bus into the first state by imposing a potential difference across the lines such that the first line 3A is positive with respect to the second line 3B. Conversely the transmitter puts the bus into the second state by imposing a potential difference across the lines of opposite polarity. The transmitter puts the bus into the third state by imposing no potential difference across the lines. The receiver circuit, when sensing the first state, presents a low state voltage and a high state voltage at the outputs of the first and second differential amplifiers, respectively. The receiver circuit, when sensing the second state, presents a high state voltage and a low state voltage at the outputs of the first and second differential amplifiers, respectively. When sensing the third state, the receiver circuit presents a high state voltage at the outputs of both differential amplifiers.

In operation, the lines are put into a first state by a high state voltage at the input 16 of the transmitter 14 causing the transmitter to impose a potential difference across the lines with the first line 3A positive with respect to line 3B if a high state voltage is present at the enable input 18, and the lines are put into a second state by a low state voltage at the input 16 of the transmitter 14 causing the transmitter to impose an opposite but equal potential difference across the lines if a positive digital signal is present at the enable input 18. The lines are put into a third state by a low state voltage at the enable input 18 causing the transmitter to present a high impedance to the line pair regardless of the signal at input 16.

The first state of the lines causes the bipolar output 36 of the first differential amplifier to be at a low state voltage, and the bipolar output 38 of the second differential amplifier to be at high state voltage. The positive side of the potential difference across the lines is applied to the base of the second transistor 24B which causes a relative positive voltage at the NIV input 28B of the second differential amplifier. The IV input 34 of the same differential amplifier senses the relative negative voltage on line 3B. The combined effect causes the output 38 to be at the high state voltage. The relative negative voltage on wire 3B is applied to the base of the first transistor 24A which causes a relative negative voltage at the NIV input 28A of the first differential amplifier. The IV input 32 senses a relative positive voltage on line 3A. The combined effect causes the output 36 to be at a low state voltage.

The second state of the lines causes the output 36 of the first differential amplifier to be at a high state voltage, and the output 38 of the second differential amplifier to be at a low voltage state. The relative positive voltage on line 3B passes to the emitter of the first transistor 24A which causes a relative positive voltage at the NIV input 28A of the first differential amplifier. The IV input 32 of the same differential amplifier senses a relative negative voltage on line 3A. The combined effect causes output 36 to be at a high state voltage. The relative negative voltage on wire 3A is applied to the base of the second transistor 24B which causes a relative negative voltage at the NIV input 28B of the second differential amplifier. The IV input 34 senses a relative positive voltage on line 3B. The combined effect causes the output 38 to be at a low state voltage.

The third state of the lines cause both differential amplifier outputs to be at a high state voltage. Since there is substantially no current in the two lines, 3A and 3B, due to the presentation of a high impedance by the transmitters, there is substantially no potential difference across the lines, therefore the NIV inputs of the differential amplifiers are at a voltage more positive than the IV inputs. Thus both differential amplifier outputs are at a high state voltage.

The capacity to send trinary digital information is used in this invention to communicate self-clocking, binary encoded data over the two wire transmission line 2. In general, the method of transmitting a single binary data bit is to first arbitrarily define two of the trinary states, say e.g. state A and state B, as the two possible logical states for the binary data bit, and define the remaining trinary state, state C, as the clock for the data bit, the clock being a marker in time which signifies the beginning or ending of a time period during which the state of the transmission line reflects a binary data bit. Secondly, by means of a transmitter, impose for a suitable time period either state A or state B on the transmission line, depending upon which of the two logical states of the data bit it is desirous to communicate, immediately preceded or followed by imposition of state C on the transmission line for a suitable period of time. Preferably, the clock follows the data bit so that the clock can trigger a memory means, in communication with a receiver, to remember the state of the receiver immediately preceding the clock. Referring to FIG. 5, states A and B are defined as the first and second states of the lines, respectively, and state C is the third or high impedance state of the lines. Therefore, the first and second states signify a data bit is being transmitted. The bus potentials shown in FIG. 5 are nominal values only.

The network of this invention does not have a master bus controller, that is, there is no device which supervises and/or schedules nodal access to the bus. Therefore it has the inherent problem of situations occuring where more than one node simultaneously transmits on the bus in synchronism or asynchonously. For example, a situation can occur where node A wishes to send data to node B, and node C wishes to send data to node D. If at any time, node A and node C are simultaneously transmitting on the bus, the data received by nodes B and D will most likely be erroneous. Since access to the bus by nodes A and C is not supervised nor scheduled, a situation of simultaneous transmission cannot be entirely avoided. Therefore it is necessary to provide a means and method by which nodes B and D can detect a simultaneous transmission and be aware that the data received during that time is most likely erroneous.

Simultaneous nodal transmissions can be asynchronous or synchronous. Synchronous transmissions occur when the data bit times and the clock times of the simultaneously transmitting nodes are in phase with each other. Asynchronous transmissions occur when the data bit times and the clock times of the nodes are out of phase with each other. Both conditions are commonly called "collisions".

Figure 6:
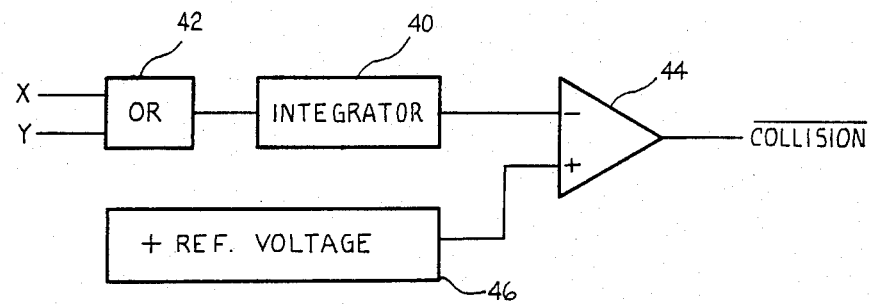
FIG. 6 is a block diagram of a collision detector.

Referring to FIG. 6, asynchronous collisions are detected at all receiving nodes by a time measuring means 40, preferably a signal integrator, in each node adapted to measure the length of time that the bus, as sensed by the node's receivers, is in the first or second states. As previously explained, the bus should only be in the first or second states when a nodal transmitter is sending a binary data bit. All transmitting nodes are required to conform to a standard time duration when sending a data bit. When more than one node is sending data out of phase with each other, a collision will necessarily lengthen the time that a data bit is present on the line beyond the preset time limit. The time measuring means will detect that condition and will communicate that fact to its node's controller.

Figure 7:
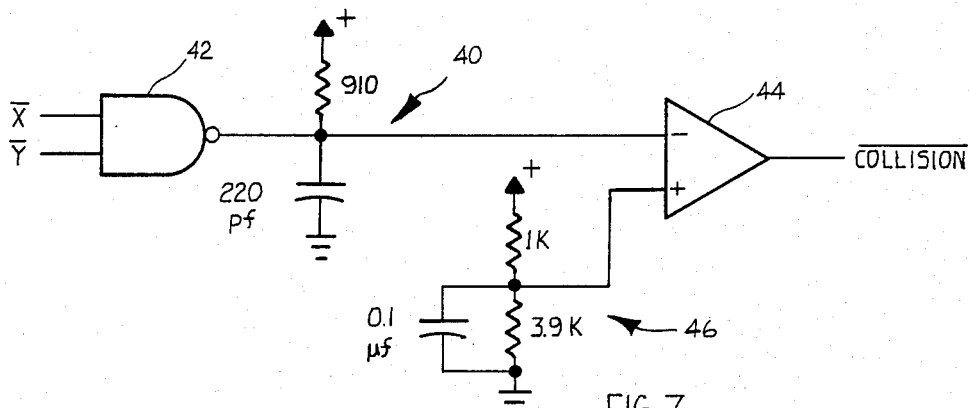
FIG. 7 is a detail schematic of the collision detector.

The input to the integrator 40 is a signal which is the logical "or" of the outputs of the differential amplifiers 30A and 30B by means of an "or" gate 42. Therefore, the integrator will receive an integratable signal whenever the bus is in the first state or the second state, but not in the third state. The output of the integrator 40 goes to an IV input of a comparator 44, and the NIV input of the comparator is fixed at a threshhold voltage, $T_V$, by a reference voltage generator 46. FIG. 7 shows the integrator 40 to comprise a series RC circuit, the resistance being 910 ohms and the capacitor being 220 picoforads. FIG. 7 also shows the reference voltage generator to be a filtered voltage divider comprising a 1K ohm resistor in series with a 3.9K ohm resistor between the energizing source and ground. The voltage across the 3.9K ohm resistor being the threshhold voltage which is filtered by a 0.1 microfarad capacitor. The "or" gate comprises an open-collector TTL NAND gate functioning as an "or" gate. The output of the comparator 44 goes to a low state voltage when a collision is detected. Preferably the standard time duration for sending a data bit is 200 nanoseconds, which is the length of time, within a suitable tolerance, that the bus should be put into the first or second states when transmitting a data bit. It is a standard because all transmitting nodes are required to comply with it. The time measuring means 40 of each receiving node is adapted to the 200 nanosecond standard. The RC circuit of FIG. 7 is adapted to not exceed the reference voltage until beyond the 200 nanoseconds.

Figure 8:
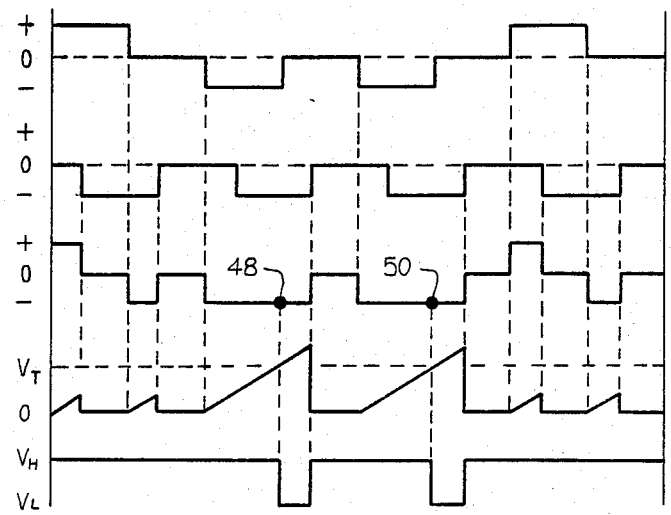
FIG. 8 is a signal diagram showing two nodes simultaneously and asynchronously transmitting and thereby causing a collision situation.

Referring to FIG. 8, two nodes, A and C, are shown to be simultaneously transmitting resulting in a collision. Both nodes are individually conforming to the standard and are not imposing a potential across the lines for more than 200 nanoseconds at a time, but their composite signals violate the standard at two points, 48 and 50. At those two points, the integrator is allowed to charge beyond the threshhold voltage, $T_V$, and the output of the collision comparator goes low on both occasions signaling a collision.

Synchronous collisions are avoided and converted to asynchronous collisions by a means in each transmitting node for randomly varying the phase of the data bits that it sends. If two or more nodes are sending data bits in phase, that condition will only exist momentarily because the phase varying means in each node will, by their random nature, kick the nodes out of phase. Once they have been kicked out of phase, the collision will be detected as an asynchronous collision as previously discussed.

Figure 9:
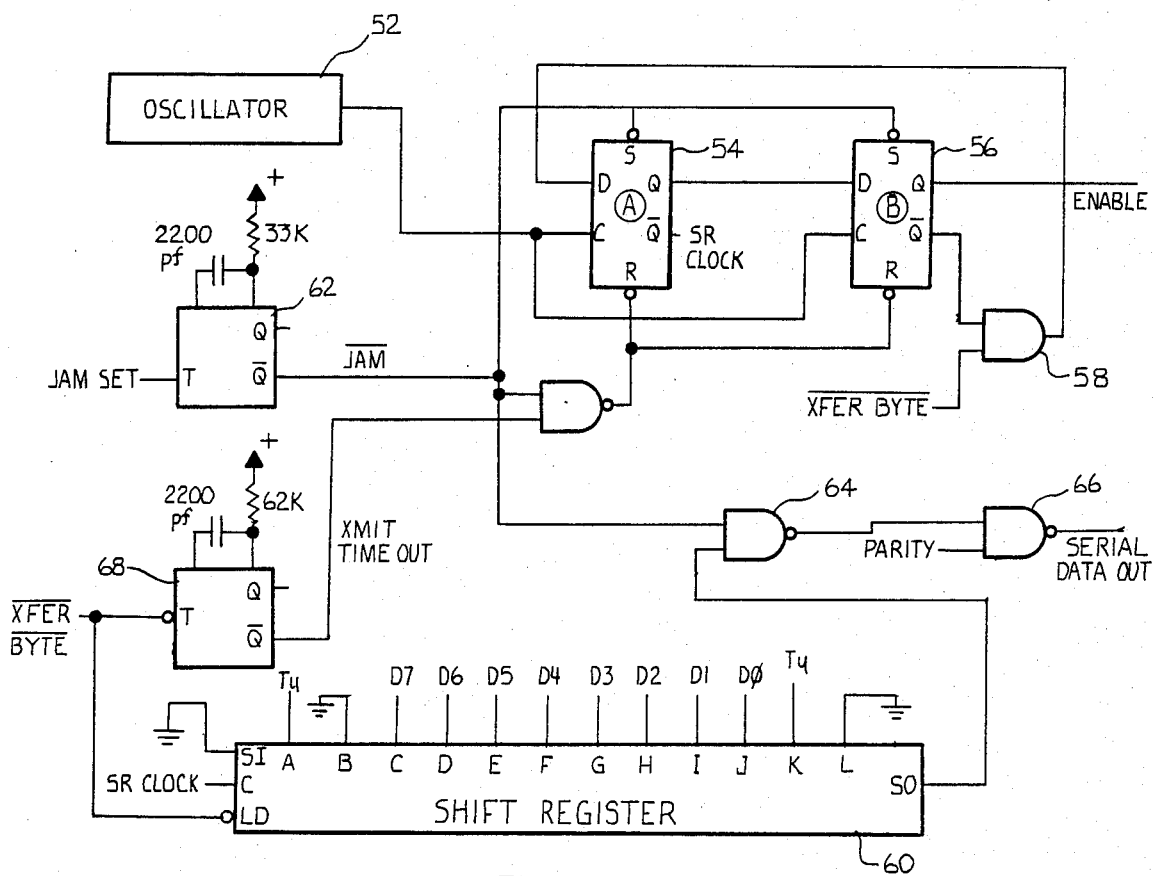
FIG. 9 is a circuit diagram of a pseudo-random phase shifting circuit.
Figure 10:
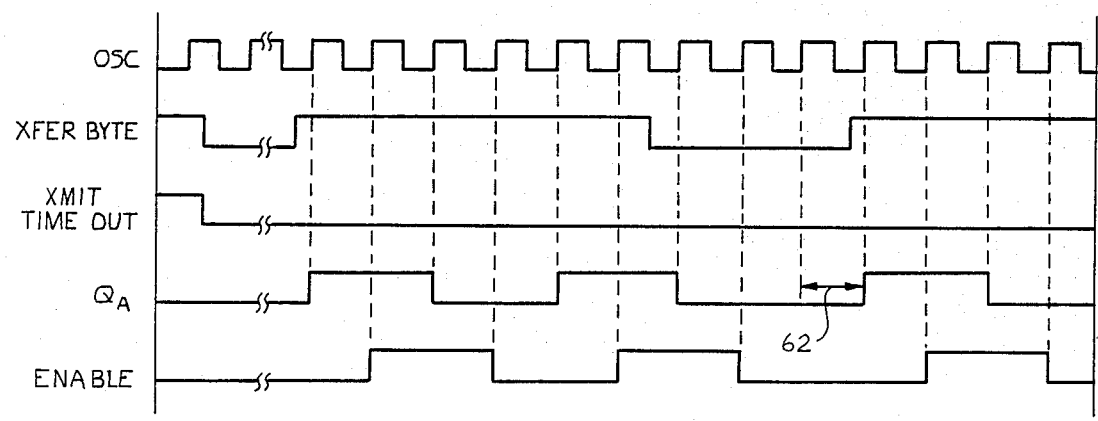
FIG. 10 is a signal diagram showing the effects of the pseudo-random phase shifting.

Referring to FIGS. 9 and 10, the timing of a node's network transmitter is shown to be controlled by an oscillator 52 continuously clocking a pair of positive-edge-triggered, "D"-type latches 54 and 56, each having overriding set and reset inputs. The latches are configured into a two-bit shift register with the inverted output of the second latch 56 being fed back through an "or" gate 58 to the D input of the first latch 54, causing the pair to function as a two-bit ring counter (see signals $Q_A$ and ENABLE of FIG. 10). A second input to the "or" gate 58 is a signal entitled "$\overline{\text{XFER BYTE}}$" which is a signal generated by the node's controller (computer or otherwise). This signal is asynchronous to the oscillator and from the standpoint of the ring counter occurs randomly. The signal $\overline{\text{XFER BYTE}}$ preferably is a signal by which the node's controller parallel loads a byte of data to an interface output shift register 60.

As seen in FIG. 10, the presence of $\overline{\text{XFER BYTE}}$ will keep the "D" input of the first latch 54 at a low state regardless of the state of the second latch 56. Thus it will delay by some integer number of oscillator cycles the clock setting of the first latch, in turn, will equally delay the clock setting of the second latch and the ENABLE signal to the transmitter (see FIG. 3). The time interval designated 62 in FIG. 10 is a delay of one oscillator cycle due to the presence of $\overline{\text{XFER BYTE}}$.

Since all nodal interfaces to the network must have a means of randomly varying the phase of their transmitted data, as shown herein, it can be seen that even if two simultaneously transmitting nodes start out in synchronicity, they will be quickly kicked out of synchronism and their simultaneous transmissions will be detected as asynchronous collisions.

When a collision is detected, that fact is communicated to the node's controller (not shown). The controller then generates a signal which causes a node's transmitter to drive the bus at the first state for approximately 30 microseconds. This insures that all nodal receivers become aware of the fact that there was a data collision. Referring again to FIG. 9, a "JAM SET" signal, generated by the node in response to a collision triggers a monostable multivibrator 62 which has an unstable time period of 30 microseconds. The monstable multivibrator when triggered generates a "JAM" signal which forces the setting of the second latch 56 and thereby enables the transmitter for the 30 microseconds. The "JAM" signal also is communicated to a shift register output gate 64 and disables the gate forcing a high at the input of a serial data out gate 66. Thus the transmitter will attempt to transmit the first bus state for the 30 microseconds.

To minimize collisions, each node desiring transmission access to the bus is required to determine if data bits are being sent. If not, and they have not been sent for some given period of time, then the node can begin transmitting data. If a collision is not detected, that node then has control of the bus, and in order to maintain control, the node must continuously send data bits. Preferably the data is divided into groups of bits which are sent in a burst followed by a time delay before sending the next group, the transmitting node, in order to maintain control of the bus, must send filler data during the time delay. Filler data need not have any meaning to the receiving node, but must be sent nonetheless. Preferably the gap between bursts is filled by binary zeroes and the first occurance of a binary one following the zeroes signifies the start of the data burst.

In order to avoid a malfunctioning node from indefinitely maintaining control of the bus, each transmitting node must have a watchdog timer which monitors meaningful data (data other than the filler data) transmissions from its node. If the timer does not detect any transmission of meaningful data for a given period, preferably 40 to 50 microseconds, the watchdog timer will disable the node's transmitter, thus releasing the bus for other nodes.

Referring to FIG. 9, a second monostable multivibrator 68 with a time period of approximately 50 microseconds is shown to be triggered by the signal $\overline{\text{XFER BYTE}}$. As previously discussed, the signal $\overline{\text{XFER BYTE}}$ occurs when the node's controller transfers a byte to the output shift registers. The monostable vibrator 68 generates a signal "XMIT TIMEOUT" which enables the first and second latches 54 and 56, to start their ring count action. The monostable multivibrator 68 is retriggerable and as long as the node's controller sends a data byte to the output shift register 60 within the approximately 50 microsecond time period, the ring counter will remain enabled and the transmitter will therefore receive periodic enable signals. Whenever there has not been any data transferred from the node's controller to the shift register within the time period, the ring counter will be disabled as will the transmitter.

Preferably, the data is sent in eight bit bytes sandwiched between data framing bits. As discussed previously, in between data transfers, that is byte transfers, a transmitter will transmit all zeroes immediately preceding the data byte in time is a start bit, which is a data bit one to distinguish it from the filler zeroes. Immediately following the data byte are two data bits, a zero and a one as error check bits. Following the error checking bits is a parity bit. Referring to FIG. 9, it can be seen that the parallel input A through L of the shift register 60 are the means by which the data byte and all of its framing bits accept the parity bit are set up. Inputs A and L are tied to a high state voltage and inputs D and L are tied to ground which is the equivalent of a low state voltage. Inputs C through J receive signals D0 through D7 from the controller. The SI input of the shift register is tied to ground so that as the byte and all of its framing bits are shifted out of the shift register, it will be followed by the filler zeroes. It has found advantageous to clock the shift register by the inverting output of the first latch 54.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A system for electrically communicating trinary information over two lines comprising:
    (a) a pair of electrically conductive lines terminated at at least one point by an impedance between the two lines which generally matches the characteristic impedance of the two lines,
    (b) one or more transmitters in electrical communication with the two lines for selectively imposing across the lines a first potential difference signifying a first logical state or a second potential difference distinct from the first signifying a second logical state, and for marking in time each imposition of said potential differences by presenting a relatively high impedance to the two lines for a time immediately adjacent in time to each of said impositions, and
    (c) one or more receivers in electrical communication with the two lines for sensing the first potential difference and interpreting that as a first logical state, for sensing the second potential difference and interpreting that as a second logical state, and for sensing when all of the transmitters are presenting a relatively high impedance to the two lines and interpreting that as a time marking signal.

2. The system according to claim 1 wherein the transmitters are in direct electrical communication with the two lines.

3. The system according to claim 1 wherein the transmitters are tri-state drivers.

4. The system according to claim 2 wherein the transmitters are tri-state drivers.

5. In a bus communication network comprising a plurality of nodes in parallel communication with the bus, at least 2 nodes being adapted to transmit a signal having three distinct states over the bus, at least one node being adapted to receive said signal and differentiate between said states, said signal comprising a time serial train of bit cells, a method of detecting asynchronous simultaneous transmissions comprising the steps:

(a) having each transmitted bit cell comprise a data bit time of suitable and uniform duration, and non-data time of suitable and uniform duration, the signal being entirely in a first or second state during each data bit time for communicating binary information, the signal being entirely in a third state during each non-data time, and (b) measuring the duration of each received data bit time to determine if it is equal, within a tolerance to the uniform data bit time duration.

6. In a bus communication network comprising a plurality of nodes in parallel communication with the bus, at least 2 nodes being from time to time transmitters of data signals comprising time serial trains of data cells of uniform duration, a method of avoiding synchronous simultaneous data transmissions comprising the steps:

(a) dividing the data into groups, (b) transmitting each group in a burst followed by a time delay before sending a next burst, (c) transmitting filler data during the time delays, and (d) generally randomly varying the duration of the time delays.

* * * * *